(12) United States Patent
Kinney et al.

(10) Patent No.: US 11,933,760 B2
(45) Date of Patent: Mar. 19, 2024

(54) CARTRIDGE, ELECTROWETTING SAMPLE PROCESSING SYSTEM AND DROPLET FORMATION

(71) Applicant: TECAN TRADING AG, Mannedorf (CH)

(72) Inventors: Patrick Kinney, Hayward, CA (US); Tin Ngo, San Jose, CA (US); Sujata Iyer, San Jose, CA (US); Daniel Hoffmeyer, San Jose, CA (US); Manjeet Dhindsa, San Jose, CA (US); Tiffany Ding (Lay), San Jose, CA (US)

(73) Assignee: TECAN TRADING AG, Mannedorf (CH)

( * ) Notice: Subject to any disclaimer, the term of this patent is extended or adjusted under 35 U.S.C. 154(b) by 0 days.

(21) Appl. No.: 17/901,634

(22) Filed: Sep. 1, 2022

(65) Prior Publication Data

US 2023/0003685 A1    Jan. 5, 2023

Related U.S. Application Data

(62) Division of application No. 15/962,945, filed on Apr. 25, 2018, now abandoned.

(51) Int. Cl.
*G01N 27/447* (2006.01)
*B01L 3/00* (2006.01)

(52) U.S. Cl.
CPC .. *G01N 27/44791* (2013.01); *B01L 3/502715* (2013.01); *G01N 27/44739* (2013.01);
(Continued)

(58) Field of Classification Search
CPC ....... G01N 27/44791; G01N 27/44739; G01N 27/44747; B01L 3/502715;
(Continued)

(56) References Cited

U.S. PATENT DOCUMENTS

| 7,618,590 B2 | 11/2009 | Gleason |
| 2007/0068573 A1* | 3/2007 | Cox ................. G01N 27/44743 137/1 |

(Continued)

FOREIGN PATENT DOCUMENTS

| WO | 2014/135232 A1 | 9/2014 |
| WO | 2014/187488 A1 | 11/2014 |

OTHER PUBLICATIONS

JP 2010-188265, machine translation (Year: 2010).*
(Continued)

*Primary Examiner* — Caitlyn Mingyun Sun
(74) *Attorney, Agent, or Firm* — Notaro, Michalos & Zaccaria P.C.

(57) ABSTRACT

A cartridge for use in an electrowetting sample processing system, the cartridge having at least one inlet port for introducing an input liquid in an internal gap of the cartridge, wherein the gap has at least one hydrophobic surface and is configured to provide an electrowetting induced movement of a microfluidic droplet of input liquid, wherein the input liquid has a carrier liquid and a processing liquid and the gap has a capture zone that is configured to capture at least a part of the processing liquid as a microfluidic droplet by use of electrowetting force and the gap further has a transfer zone that is configured to provide a passage for the carrier liquid next to the microfluidic droplet, while processing liquid is captured in the capture zone.

26 Claims, 6 Drawing Sheets

(52) U.S. Cl.
CPC .. *G01N 27/44747* (2013.01); *B01L 2200/027* (2013.01); *B01L 2300/161* (2013.01); *B01L 2400/0427* (2013.01)

(58) Field of Classification Search
CPC ........... B01L 3/502792; B01L 3/50273; B01L 2200/027; B01L 2300/161; B01L 2300/0816; B01L 2400/0427
See application file for complete search history.

(56) References Cited

U.S. PATENT DOCUMENTS

| | | |
|---|---|---|
| 2013/0288254 A1 | 10/2013 | Pollack |
| 2015/0352544 A1* | 12/2015 | Buermann ........ B01L 3/502715 435/6.12 |
| 2016/0016170 A1* | 1/2016 | Lay .................... B01L 3/50273 204/601 |
| 2016/0231324 A1 | 8/2016 | Zhao |
| 2017/0198249 A1 | 7/2017 | Kiyama |

OTHER PUBLICATIONS

M.G. Pollack, Electrowetting-based actuation of droplets for integrated microfluidics, 2, Lap Chip, 2002, p. 96-101. (Year: 2002).

* cited by examiner

CARTRIDGE, ELECTROWETTING SAMPLE PROCESSING SYSTEM AND DROPLET FORMATION

RELATED APPLICATION

This patent application is a divisional of U.S. patent application Ser. No. 15/962,945 filed on Apr. 25, 2018, the whole content thereof being incorporated into the present application by explicit reference for any purpose.

TECHNICAL FIELD OF THE INVENTION

The current invention relates to a cartridge, in particular a disposable cartridge for use in an electrowetting sample processing system an electrowetting sample processing system and a method for operating such a cartridge or system.

DESCRIPTION OF THE RELATED ART

Known embodiments of such cartridges are disclosed for example in WO 2014/135232 A1, describing an in-cartridge separation of a droplet from a larger liquid volume previously inserted into the gap.

SUMMARY OF THE INVENTION

It is a task of the current invention to provide a cartridge that allows for a precise and versatile processing of microfluidic droplets.

This task is solved by a cartridge with the features of claim 1. Further embodiments of the cartridge, an electrowetting sample processing system with or without such a cartridge, as well as a method for operating such a cartridge or system are defined by the features of further claims.

A cartridge according to the invention, in particular a disposable cartridge for use in an electrowetting sample processing system, comprises a at least one inlet port for introducing an input liquid in an internal gap of the cartridge. The gap comprises at least one hydrophobic surface and is configured to provide an electrowetting induced movement of a microfluidic droplet of input liquid. The input liquid comprises a carrier liquid and a processing liquid. The gap comprises a capture zone that is configured to capture at least a part of the processing liquid as a microfluidic droplet by use of electrowetting force. The gap further comprises a transfer zone that is configured to provide a passage for the carrier liquid next to the microfluidic droplet, while processing liquid is captured in the capture zone.

This allows an easy and precise separation of a large variety of processing liquids and carrier liquids.

In an embodiment, the cartridge comprises a first part with the inlet port and a second part attached to the first part, such that the gap is formed between the first part and the second part. The first part can be a top layer of the cartridge and the second part can be a bottom layer of the cartridge or vice-versa.

In an embodiment, the first part comprises a rigid body and/or the second part comprises or is an electrode support element or a flexible film, in particular a polymer film and/or an electrically isolating film.

In an embodiment, the gap is defined by a spacer that is arranged between the first part and the second part and/or by the shape of at least one of the two parts of the cartridge, in particular by a flexible part or a rigid part of the cartridge, and wherein in particular the second part is attached to a peripheral side structure of the first part.

In an embodiment, the cartridge comprises at least one electrode, in particular an electrode array for applying an electrowetting force to the microfluidic droplet. A plurality of electrodes can be arranged in a first lateral direction and in a second lateral direction, perpendicular to the first lateral direction. The size of an electrode can be in the range of approximately 1.5×1.5 mm. The cartridge can have several zones that are separated from one another by at least one separation zone or a separation wall. All zones are connected to a delivery zone. In an embodiment, the cartridge comprises an inlet channel for transferring the processing liquid from the inlet port to the gap, wherein in particular the inlet channel is arranged substantially perpendicular to the orientation of the gap. Alternatively, the inlet channel is oriented at an angle of less than 90° to the orientation of the gap. For example, the inlet channel can also be oriented parallel to the orientation of the gap.

In an embodiment, the input liquid comprises a carrier liquid, in particular an electrowetting filler liquid, further in particular a silicone oil.

In an embodiment, the cartridge is configured to capture the processing liquid, which comprises at least one of: a reagent liquid, a buffer, a diluent, an extraction liquid, a washing liquid and a suspension, which further in particular is a suspension of magnetic beads, single cells or cell aggregates.

In an embodiment, the cartridge is configured to be operated with a carrier liquid that is an electrowetting filler liquid, further in particular a silicone oil.

In an embodiment, the cartridge is configured to receive the input liquid, in which the carrier liquid encloses the processing liquid, sequentially and/or alternatingly.

In an embodiment, the cartridge is configured to provide the transfer zone by an open space, which is located between the inlet port and the top of the microfluidic droplet captured in the capture zone.

In an embodiment, the transfer zone is configured to provide an axis of flow that is arranged with an offset from the center of the captured processing liquid, in particular with an offset of at least a quarter of a largest diameter of the microfluidic droplet, further in particular at least half of the largest diameter of the microfluidic droplet.

In an embodiment, the cartridge comprises at least one capture electrode that is located adjacent to the inlet port such that this capture electrode covers less than 50% of the inlet port.

In a further embodiment the cartridge comprises at least one capture zone that is located closest to the inlet port such that the area of the capture zone covers between 5% and 95% of the opening area of the inlet port, in particular between 10% and 90%, further in particular between 25% and 75%.

In a further embodiment the cartridge comprises at least at least one capture electrode that is located closest to the inlet port (19') such that the area of the capture electrode covers between 5% and 95% of the opening area of the inlet port (19'), in particular between 10% and 90%, further in particular between 25% and 75%.

The term "covering" describes a geometrical overlapping configuration in a projection longitudinally to an axis of the inlet port and/or along an axis of flow exiting the opening area of the inlet port. This corresponds to a visual appearance viewed along an optical axis that is perpendicular to the electrode array in a direction towards the electrode array.

The above configurations ensure that the inlet port is not blocked by the captured microfluidic droplet. This is achieved by activating electrodes to the side of the inlet port.

In an embodiment, the cartridge is configured to receive the processing liquid that comprises multiple parts, in particular parts of different compositions, and to accumulate these parts for providing the microfluidic droplet.

In an embodiment, the cartridge is configured to receive at least one part of the processing liquid that comprises a volume that is insufficient for a transportation by electrowetting and/or that comprises a volume of less than 2 µl, in particular less than 1.5 µl.

In an embodiment, the cartridge is configured to capture or to accumulate a microfluidic droplet of less than 10 µl in volume, in particular of less than 3 µl in volume.

In an embodiment, the inlet port comprises a sealing surface for a tube to be inserted into the inlet port. In particular, the inlet port is funnel-shaped with an enlarged opening towards the tube to be inserted. The funnel-shape can be realized by a cone, in particular by a centering cone.

The features of the above-mentioned embodiments of the cartridge can be used in any combination, unless they contradict each other.

An electrowetting sample processing system according to the invention, in particular a biological sample processing system comprising a cartridge according to anyone of the above-mentioned embodiments.

An electrowetting sample processing system according to the invention comprises at least one inlet port for introducing an input liquid and an internal gap that comprises at least one hydrophobic surface and that is configured to manipulate a microfluidic droplet separated from the input liquid, if an electrowetting force is applied to the at least one microfluidic droplet. The input liquid comprises a processing liquid and a carrier liquid. The gap comprises a capture zone that is configured to capture at least a part of the processing liquid by use of electrowetting force and the gap further comprises a transfer zone that is configured to provide a passage for the carrier liquid from the inlet port to the gap, while processing liquid is captured in the capture zone.

In an embodiment, the electrowetting sample processing system comprises at least one electrode, in particular an electrode array, for applying an electrowetting force to the processing liquid and/or the microfluidic droplet.

In an embodiment, the electrowetting sample processing system comprises a flexible cartridge, which is reversibly attachable to the electrodes of the electrowetting sample processing system, wherein in particular the cartridge comprises a flexible second part, further in particular a flexible film or membrane.

In an embodiment, the electrowetting sample processing system or the cartridge comprises a processing zone, which is configured for processing samples, in particular for processing a biological sample, and/or which is operably connected to the delivery zone.

In an embodiment, the processing zone is configured for processing at least one of:
 a chemical reaction,
 a washing process,
 a heating process,
 a mixing process,
 a dilution, and
 a hybridization.

In an embodiment, the processing zone is configured for processing a PCR (Polymerase chain reaction) process and/or a hybridization.

In an embodiment, at least one electrode comprises at least one capture electrode that is configured to capture at least a part of the processing liquid as a microfluidic droplet by use of electrowetting force. In particular, the closest edge of the capture electrode is arranged with an offset from the axis of flow of the inlet port, further in particular with an offset of at least a quarter or at least half of a largest diameter of the capture electrode.

In an embodiment, at least one electrode comprises at least one capture electrode that is configured such that the area of the capture electrode covers more than 5% of the opening of the inlet port, in particular more than 10%, and/or less than 50% of the opening of the inlet port.

In a further embodiment, the one of the at least one capture electrode located closest to the inlet port covers between 5% and 95% of the opening area of the inlet port, in particular between 10% and 90%, further in particular between 25% and 75%.

Every electrode can be configured to be a capture electrode, by activating it. That is all activated electrodes are capture electrodes. By means of a control, every electrode can be brought to an activated state or a non-activated state.

In an embodiment, at least one electrode of the electrowetting sample processing system comprises at least one capture electrode that is located adjacent to the inlet port such that this capture electrode covers less than 50% of the inlet port.

In an embodiment, the at least one electrode comprises a transport electrode for removing the microfluidic droplet from the capture zone. Every electrode can be configured as a transport electrode. The activated electrodes in the inlet port region are called capture electrodes. After enough processing liquid has been accumulated by the capture electrodes, no new processing liquid is accumulated, and the capturing electrodes become transport electrodes. If an electrode adjacent to the capture electrodes is activated, the captured microfluidic droplet is also drawn to the newly activated electrode. If subsequently, the electrode closest to the inlet port is switched off, i.e. is deactivated, the microfluidic droplet moves away from the inlet port region. Thus, by activating adjacent electrodes and deactivating electrodes on the opposite side of the microfluidic droplet, the microfluidic droplet can be moved in any direction within the gap.

In an embodiment, the electrowetting sample processing system comprises a controller and/or an electrical interface for providing electrical control signals to the at least one electrode.

In an embodiment, the electrowetting sample processing system comprises a liquid feeder or liquid supply channel that is operatively connected to the inlet port by a tube, in particular a flexible tube, for feeding an input liquid of predetermined volume to the inlet port.

In an embodiment, the liquid feeder is configured to provide the input liquid as at least one sequential and/or alternating feed of the processing liquid and the carrier liquid.

In an embodiment, the electrowetting sample processing system comprises a detector for monitoring the feed of the input liquid in particular the processing liquid and/or the carrier liquid. The detector can be arranged before the inlet port or after it. For example, the detector can be arranged at the liquid feeder or within the gap in the inlet port region of the gap. There can also be more than one detector, for example one at the feeder and one in the gap.

In an embodiment, the electrowetting sample processing system comprises a controller for operating the liquid feeder, in particular a droplet generator independently and/or asynchronously from the operation of electrodes used for electrowetting.

The features of the above-mentioned embodiments of the electrowetting sample processing system can be used in any combination, unless they contradict each other.

A method for operating the cartridge according to the invention or for operating the sample processing system according to the invention.

A method for operating a cartridge according to the invention that comprises an inlet port and an internal gap with a capture zone (62) and a transfer zone, the method comprising:

providing an input liquid that comprises a processing liquid and a carrier liquid;

separating at least a part of the processing liquid in the capture zone by use of electrowetting force;

transferring the carrier liquid from the inlet port to the gap via the transfer zone, while the processing liquid is captured in the capture zone; and capturing at least a part of the processing liquid in the capture zone for providing a microfluidic droplet that is movable by applying an electrowetting force to the microfluidic droplet.

In an embodiment, the step of providing the input liquid is accomplished by sequentially and/or alternatingly feeding the processing liquid and the carrier liquid.

In an embodiment, the input liquid comprises multiple liquid parts, in particular parts of different compositions, and the capturing is accomplished by accumulating these parts for providing the microfluidic droplet.

In an embodiment, the input liquid comprises at least one part that comprises a volume that is insufficient for a transportation by electrowetting and/or that comprises a volume of less than 2 µl, in particular less than 1.5 µl.

The minimum value depends on the size of the electrodes and the gap size, for example, a system with smaller electrodes allows to control smaller microfluidic droplets.

In a further embodiment, the method comprises sequentially actuating electrodes for inducing a motion of the microfluidic droplets away from the capture zone, thereby enabling a following part of the processing liquid to be captured.

The features of the above-mentioned embodiments of the method can be used in any combination, unless they contradict each other.

BRIEF DESCRIPTION OF THE DRAWINGS

Embodiments of the current invention are described in more detail in the following with reference to the figures. These are for illustrative purposes only and are not to be construed as limiting. It shows FIG. 1 an overview over an exemplary digital microfluidics system that is equipped with a central control unit and a base unit, with four cartridge accommodation sites and with four board accommodation sites for receiving a electrode board that each comprises an electrode array.

DETAILED DESCRIPTION OF THE INVENTION

Figure 1:
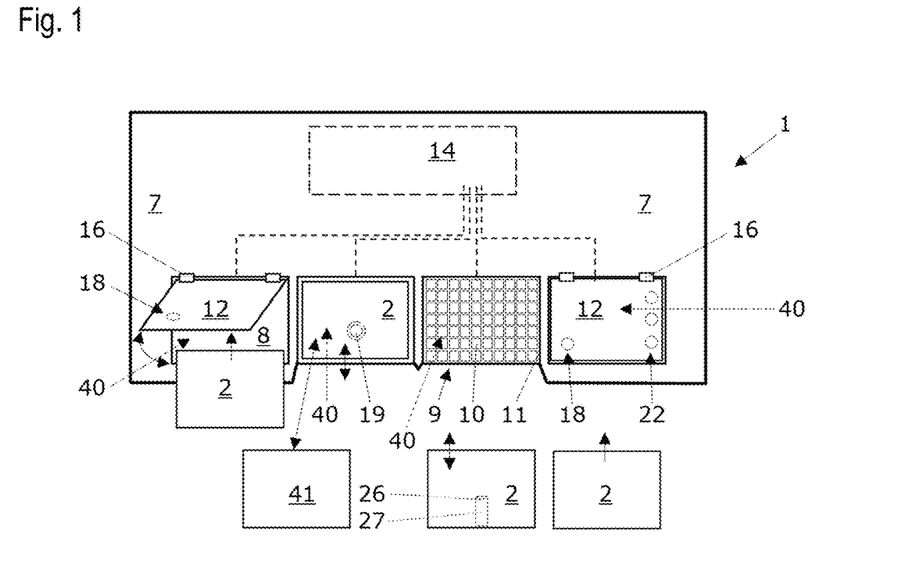

The FIG. 1 shows an overview over an electrowetting sample processing system exemplary shown as digital microfluidics system 1 that is equipped with a central control unit 14 and a base unit 7, with four cartridge accommodation sites 8 that each comprise an electrode array 9, and a cover plate 12. The digital microfluidics system 1 is configured for manipulating samples in microfluidic droplets 23, simply called liquid droplets 23, within cartridges designed as disposable cartridges 2. This digital microfluidics system 1 also comprises four board accommodation sites 40 for receiving an electrode board 41. The droplets 23 can be a microfluidic droplet and/or a liquid comprising at least one of a reagent, a buffer, a diluent, an extraction liquid, a washing liquid and a suspension, which in particular is a suspension of magnetic beads, single cells or cell aggregates. Samples are for example DNA (Desoxyribonucleic acid), RNA (Ribonucleic Acid), derivatives thereof, proteins, cells, or other biologically or biochemically derived molecules or combinations thereof.

The digital microfluidics system 1 comprises a base unit 7 with at least one cartridge accommodation site 8 that is configured for taking up a disposable cartridge 2. The digital microfluidics system 1 can be a standalone and immobile unit, on which a number of operators are working with cartridges 2 that they bring along. The digital microfluidics system 1 thus may comprise a number of cartridge accommodation sites 8 and a number of electrode arrays 9 at least some of which are located on electrode boards 41.

It may be preferred to integrate the digital microfluidics system 1 into a liquid handling workstation or into a Freedom EVO® robotic workstation, so that a pipetting robot can be utilized to transfer liquid portions and/or sample containing liquids to and from the cartridges 2.

Alternatively, the system 1 can be can be configured as a hand-held unit which only comprises and is able to work with a low number, e.g. a single disposable cartridge 2.

Every person of skill will understand that intermediate solutions that are situated in-between the two extremes just mentioned will also operate and work within the gist of the present invention.

According to the present invention, the digital microfluidics system 1 also comprises at least one board accommodation site 40 for taking up an electrode board 41 which comprises an electrode array 9 that substantially extends in a first plane and that comprises a number of electrodes 10. Such an electrode board 41 preferably is located at each one of said cartridge accommodation sites 8 of the base unit 7. Preferably each electrode array 9 is supported by a bottom substrate 11. It is noted that the expressions "electrode array", "electrode layout", and "printed circuit board (PCB)" are utilized herein as synonyms.

The digital microfluidics system 1 may also comprise at least one cover plate 12 with a top substrate; though providing of such cover plates 12 is particularly preferred, at least some of the cover plates may be dispensed with or may be replaced by an alternative cover for holding a disposable cartridge 2 in place inside the base unit of the microfluidics system 1. Thus, at least one cover plate 12 may be located at one of said cartridge accommodation sites 8. The cover plate 12 and the bottom substrate 11 with the electrode array 9 or PCB define a space or cartridge accommodation site 8 respectively. In a first variant (see the two cartridge accommodation sites 8 in the middle of the base unit 7, the cartridge accommodation sites 8 are configured for receiving a slidingly inserted disposable cartridge 2 that is movable in a direction substantially parallel with respect to the electrode array 9 of the respective cartridge accommodating site 8. Such front- or top-loading can be supported by a drawing-in automatism that, following a partial insertion of a disposable cartridge 2, transports the cartridge 2 to its final destination within the cartridge accommodation site 8, where the cartridge 2 is precisely seated. Preferably, these cartridge accommodation sites 8 do not comprise a movable cover plate 12. After carrying out all intended manipulations to the samples in liquid droplets, the used cartridges 2 can be ejected by the drawing-in automatism and transported to an analysis station or discarded.

In a second variant (see the two cartridge accommodation sites 8 on the right and left of the base unit 7), the cartridge accommodation sites 8 comprise a cover plate 12 that is configured to be movable with respect to the electrode array 9 of the respective cartridge accommodating site 8. The cover plate 12 preferably is configured to be movable about one or more hinges 16 and/or in a direction that is substantially normal to the electrode array 9.

Similar to the possibilities for inserting a disposable cartridge 2 into a cartridge accommodation site 8, possibilities for inserting the electrode board 41 into a board accommodation site 40 comprise the following alternatives:
(a) vertically lowering the electrode board 41 through the respective cartridge accommodation site 8 and into the board accommodation site 40;
(b) horizontally sliding the electrode board 41 below the respective cartridge accommodation site 8 and into the board accommodation site 40;
(c) horizontally sliding the electrode board 41 below the respective cartridge accommodation site 8 and substantially vertically lifting into the board accommodation site 40.

In FIG. 1, there is drawn only one electrode board 41 that slidingly can be inserted by front loading below the second cartridge accommodation site 8 (as counted from the left). All possible places for locating a board accommodation site 40 are indicated and pointed to by dashed arrows.

The digital microfluidics system 1 also comprises a central control unit 14 for controlling the selection of the individual electrodes 10 of said at least one electrode array 9 and for providing these electrodes 10 with individual voltage pulses for manipulating liquid droplets within said cartridges 2 by electrowetting. As partly indicated in FIG. 1, every electrode 10 is operatively connected to the central control unit 14 and therefore can be independently or commonly addressed by this central control unit 14, which also comprises the appropriate sources for creating and providing the necessary electrical potentials in a way known in the art.

The at least one cover plate 12 preferably comprises an electrically conductive material that extends in a second plane and substantially parallel to the electrode array 9 of the cartridge accommodation site 8 the at least one cover plate 12 is assigned to. It is particularly preferred that this electrically conductive material of the cover plate 12 is configured to be not connected to a source of an electrical ground potential. The cover plate 12 can be configured to be movable in any arbitrary direction and no electrical contacts have to be taken in into consideration when selecting a particularly preferred movement of the cover plate 12. Thus, the cover plate 12 may be configured to be also movable in a direction substantially parallel to the electrode array 9 and for carrying out a linear, circular or any arbitrary movement with respect to the respective electrode array 9 of the base unit 7.

Figure 2:
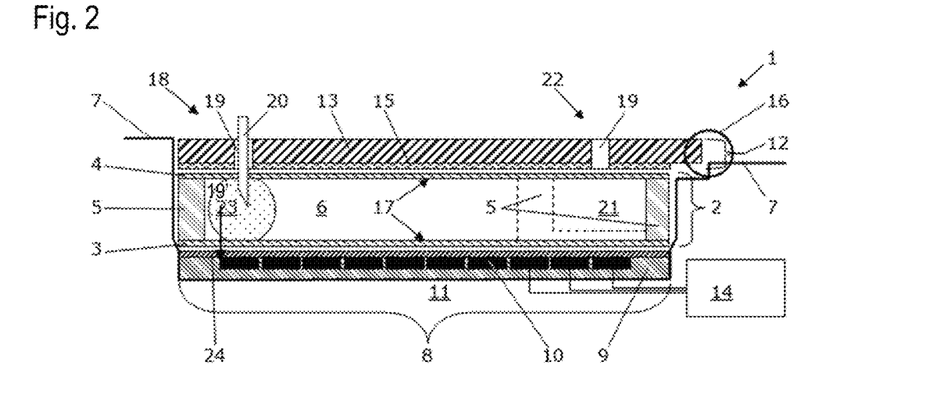
FIG. 2 a section view of one cartridge accommodation site with a disposable cartridge according to FIG. 1 therein; the electrode array being located on a fixed bottom substrate.

The FIG. 2 shows a section view of one exemplary cartridge accommodation site 8 with the disposable cartridge 2 according to FIG. 1 accommodated therein. The disposable cartridge 2 comprises a bottom layer 3 as a second part of the cartridge 2, a top layer 4 as a first part of the cartridge 2, and a spacer 5 that defines a gap 6 between the bottom and top layers 3,4 for manipulating samples in liquid droplets 23 in this gap 6.

The cover plate 12 is mechanically connected with the base unit 7 of the digital microfluidics system 1 via a hinge 16; thus, the cover plate 12 can swing open and a disposable cartridge 2 can be placed on the cartridge accommodation site 8 via top-entry loading (see FIG. 1). An electrically conductive material 15 of the cover plate 12 is configured as a thin metal plate or metal foil that is attached to the top substrate 13. Alternatively, the electrically conductive material 15 of the cover plate 12 is configured as a metal layer that is deposited onto the top substrate 13. Such deposition of the conductive material 15 may be carried out by chemical or physical vapor deposition techniques as they are known per se.

The cover plate 12 is configured to apply a force to a disposable cartridge 2 that is accommodated at the cartridge accommodation site 8 of the base unit 7. This force urges the disposable cartridge 2 against the electrode array 9 in order to position the bottom layer 3 of the cartridge as close as possible to the surface of the electrode array 9. This force also urges the disposable cartridge 2 into the perfect position on the electrode array 9 with respect to a piercing facility 18 of the cover plate 12. This piercing facility 18 is configured for introducing sample droplets into the gap 6 of the cartridge 2. The piercing facility 18 is configured as a through hole 19 that leads across the entire cover plate 12 and that enables a piercing pipette tip 20 to be pushed through and pierce the top layer 4 of the cartridge 2. The piercing pipette tip 20 may be a part of a handheld pipette (not shown) or of a pipetting robot (not shown).

In the case shown in FIG. 2, the electrode array 9 is covered by a dielectric layer 24. The electrode array 9 is fixed to a bottom substrate 11 and every individual electrode 10 is electrically and operationally connected with the central control unit 14 (only three connections of the ten electrodes 10 are drawn here). The electrode array 9 is located on an immovably fixed bottom substrate 11. The digital microfluidics system 1 is configured for manipulating samples in liquid droplets 23 within disposable cartridges 2 that contain a gap 6. Accordingly, the samples in liquid droplets 23 are manipulated in the gap 6 of the disposable cartridge 2. The disposable cartridge 2 comprises the bottom layer 3, the top layer 4, and the spacer 5 that defines the gap 6 between the bottom and top layers 3,4 for manipulating samples in liquid droplets 23 in this gap 6. The bottom layer 3 and the top layer 4 comprise a hydrophobic surface 17 that is exposed to the gap 6 of the cartridge 2. The bottom layer 3 and the top layer 4 of the cartridge 2 are entirely hydrophobic films or at least comprise a hydrophobic surface that is exposed to the gap 6 of the cartridge 2. The spacer 5 of the cartridge 2 may optionally be configured as a body that includes compartments 21 for reagents needed in an assay that is applied to the sample droplets in the gap 6 (dotted lines).

In one example, the bottom substrate 11 or the PCB that contains the electrode array 9 or the electrodes 10 has an electrical connector, which connects to a relay PCB, which is connected to a control PCB, wherein the control PCB is part of the central control unit 14.

Figure 3:
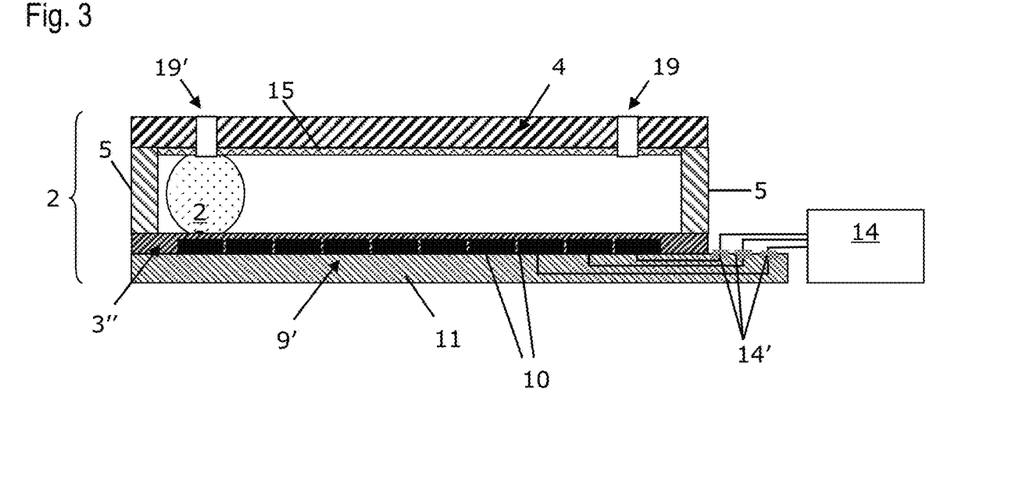
FIG. 3 a section view of a further exemplary cartridge accommodation site according to FIG. 2, wherein the electrode array is a part of the cartridge.

FIG. 3 shows a section view of a further exemplary cartridge accommodation site according to FIG. 2 with a cartridge 2, wherein—in contrast to FIG. 2—the cartridge 2 comprises an electrode array 9' of individual electrodes 10.

Further the cartridge 2 comprises an upper part 4, a spacer 5, a hydrophobic layer 3", a support element 11' for the electrode array 9', an optional through hole 19, a liquid input port 19' and electrically conductive material. The upper part 4 and the spacer 5 may be provided as separate parts or in form of a single piece. The hydrophobic layer 3", the electrode array 9' and the support element 11' form the lower part of the cartridge. The electrode array 9' is arranged between the hydrophobic layer 3" and the support element 11' and the gap is formed between the upper part 4 and the hydrophobic layer 3". Further, the hydrophobic layer 3" is attached to a peripheral side structure of the upper part 4 resp. to the spacer 5. The support element 11' further comprises electrical connectors 14', which are connected via multiple electrical wires to the electrode array 9'. In turn, the electrical connectors 14' provide for a connection to a central control unit 14 such that the electrical connectors 14' implement an electrical interface between cartridge 2 and the digital microfluidics system 1. The electrical interface can also be implemented by a contact field, i.e. a plurality of electrically conductive, mutually insulated contact areas.

Figure 4:
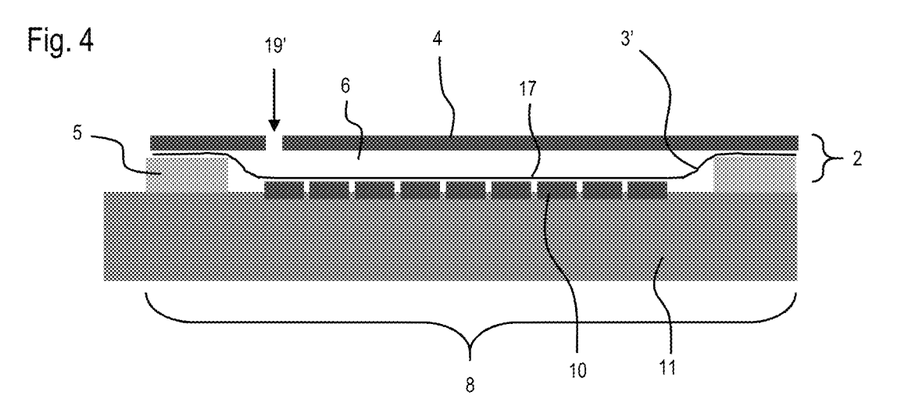
FIG. 4 a section view of an exemplary cartridge accommodation site with a disposable cartridge according to a further embodiment accommodated therein; the cartridge comprising a flexible bottom layer.

FIG. 4 shows section view of one cartridge accommodation site 8 with a disposable cartridge 2 according to a further embodiment accommodated therein. Again, the electrodes 10 are arranged on and fixed to the bottom substrate 11. Again, the disposable cartridge 2 comprises a bottom layer 3' and a top layer 4. Attached to the disposable cartridge is a spacer 5 that defines a gap 6 between the bottom and top layer 3, 4 for manipulating samples in liquid droplets 23 in this gap 6. In this embodiment, the bottom layer is a flexible bottom layer, for example a membrane 3', for example with a hydrophobic surface 17. For example, the membrane 3' is a 8 to 50 μm thick polypropylene film. An inlet port 19' for introducing liquid into the gap 6 is provided in the top layer 4 of the cartridge 2.

Preferably, the flexible bottom layer 3 is reversibly attached to the electrodes 10 in an electrowetting sample processing system 1. The spacer 5 may be a part of the cartridge 2 or a part of the electrowetting sample processing system 1. In one example, the spacer 5 comprises stainless steel, aluminum, hard plastic, in particular COP or ceramic. The spacer 5 may be designed to define the height of the gap 6. The spacer 5 may additionally serve as a gasket for sealing the gap 6.

Figure 5:
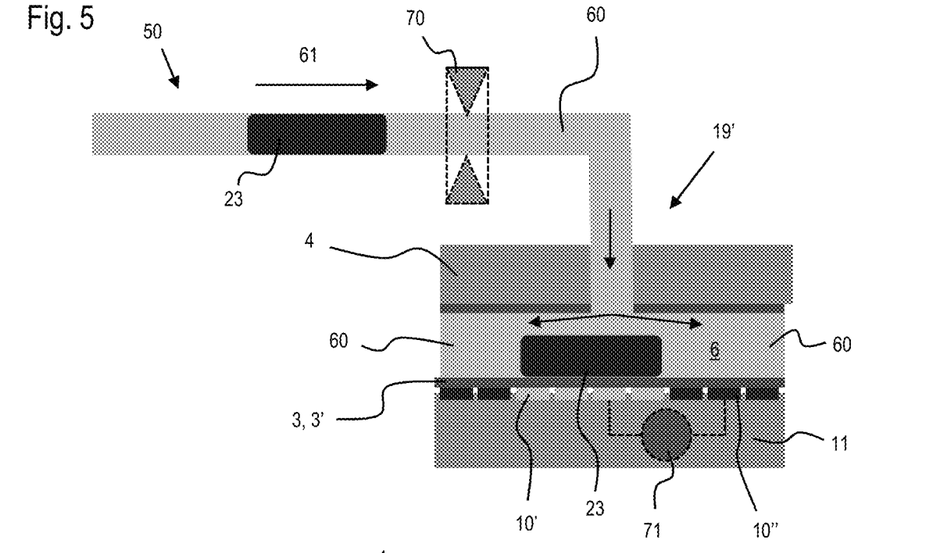
FIG. 5 a schematic view of the inlet port region of a disposable cartridge according to the invention with optional droplet detectors, wherein the inlet port being arranged at the top of the cartridge.

FIG. 5 shows a schematic view of the inlet port region of a disposable cartridge 2 according to the invention with optional droplet detectors 70, 71, wherein the inlet port 19' is arranged at the top of the cartridge 2, i.e. at the top layer 4. An input liquid 60, 61 can be introduced into the gap 6 of the cartridge 2 by means of the inlet port 19'. The input liquid comprises a carrier liquid 60 and a processing liquid 61. A quantity of processing liquid 61, surrounded by carrier liquid 60 is supplied to the inlet port 19' by means of a supply channel 50. The quantity of processing liquid corresponds to that of a liquid droplet 23, which is the ideal amount of liquid for the further processing within the cartridge 2. The number of processing liquid droplets within the supply channel and their sizes can be determined by means of a first droplet detector 70. In one example the second droplet detector 70 monitors an optical characteristic, in particular an optical transmissivity and/or reflexivity, of the carrier liquid 60 and/or the processing liquid 61. In another example the second droplet detector 70 monitors an electrical characteristic, in particular a capacitance and/or a resistance, of the carrier liquid 60 and/or the processing liquid 61. The introduced processing liquid 61 is captured by the activated electrodes 10' and forming the liquid droplet 23, whereby the carrier liquid 60 can bypass the droplet 23 on all sides and enter the free space of the gap 6. The presence of a droplet 23 in the gap 6 of the cartridge 2 can additionally or alternatively be detected by means of a second droplet detector 71.

In one example the second droplet detector 71 monitors an electrical characteristic between the activated electrodes 10' and the non-activated electrode underneath the entrance of the inlet port 19', in particular a potential difference.

Figure 6:
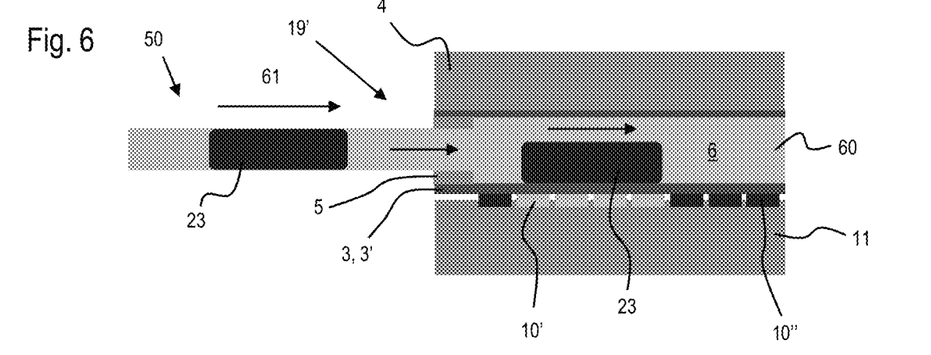
FIG. 6 a schematic view of the inlet port region of a disposable cartridge according to the invention, wherein the inlet port being arranged at the side of the cartridge.

FIG. 6 shows a schematic view of the inlet port region of a disposable cartridge 2 according to the invention, wherein the inlet port 19' is arranged at the side of the cartridge 2. In the depicted case, the inlet port 19' is arranged in the spacer 5. Of course, the droplet detectors 70, 71 can also be used together with this embodiment.

Figure 7:
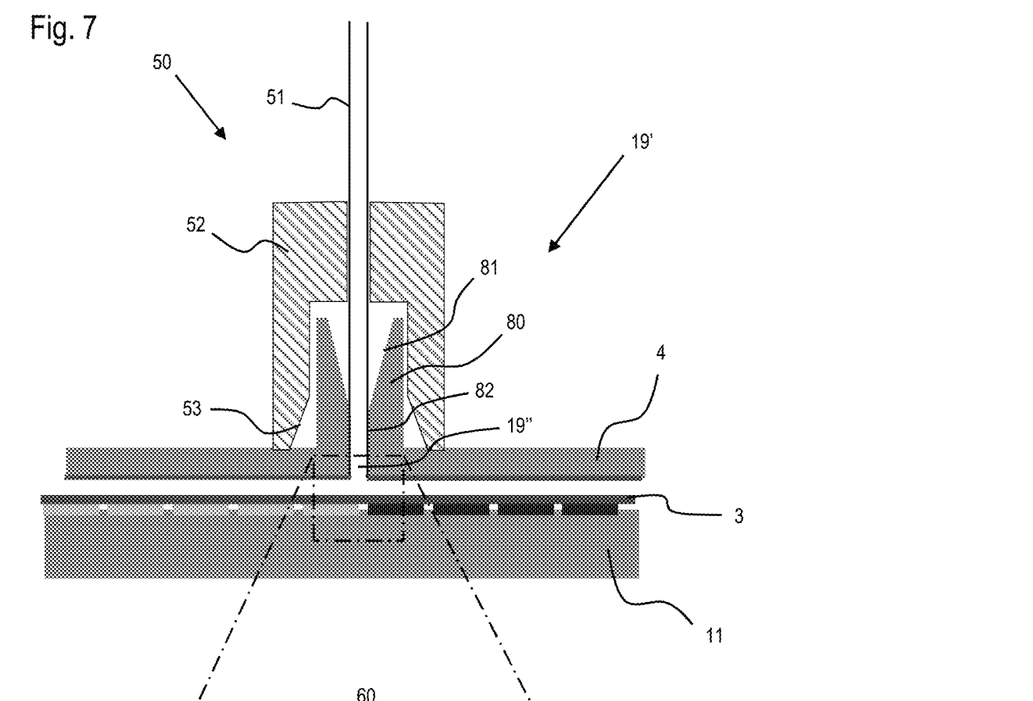
FIG. 7 a schematic view of a first embodiment of an inlet port according to the invention.

FIG. 7 shows a schematic view of a first embodiment of an inlet port 19' according to the invention. A first connecting sleeve 80 is arranged at the top of the top layer 4. The first connecting sleeve 80 is formed integrally with the top layer 4. The first connecting sleeve 80 comprises a centering cone 81 at its inside, wherein the centering cone 81 faces away from the top layer 4 and widens with an increased distance to the top layer 4. The supply channel 50 comprises a tube 51 and a second connecting sleeve 52 with a centering cone 53 at its inside. During the assembly, the tube 51 is centered by the centering cone 81 of the first connecting sleeve 80. When completely inserted, the tube 51 forms a tight connection with the first connecting sleeve 80. The centering cone 53 of the second connecting sleeve 52 faces the top layer 4 and widens with a reduced distance to the top layer 4. The inside of the second connecting sleeve 52 is bigger than the outside of the first connecting sleeve 80. During the assembly, the second connecting sleeve 52 is centered by the outside of the first connecting sleeve 80. The free inner space in the inlet port 19' forms the inlet channel 19".

Figure 8:
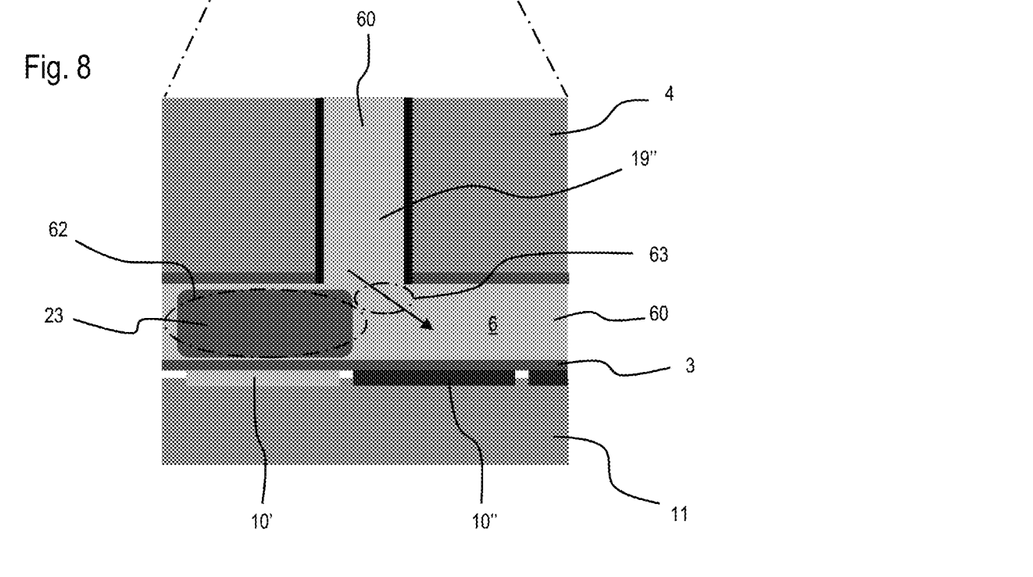
FIG. 8 a detailed view of FIG. 7.

FIG. 8 shows a detailed view of FIG. 7, wherein a liquid droplet 23 is captured within the capture zone 62 within the gap 6 by means of the activated electrodes 10' and wherein the carrier liquid 60 bypasses the droplet 23 in the transfer zone within the gap 6.

Figure 9:
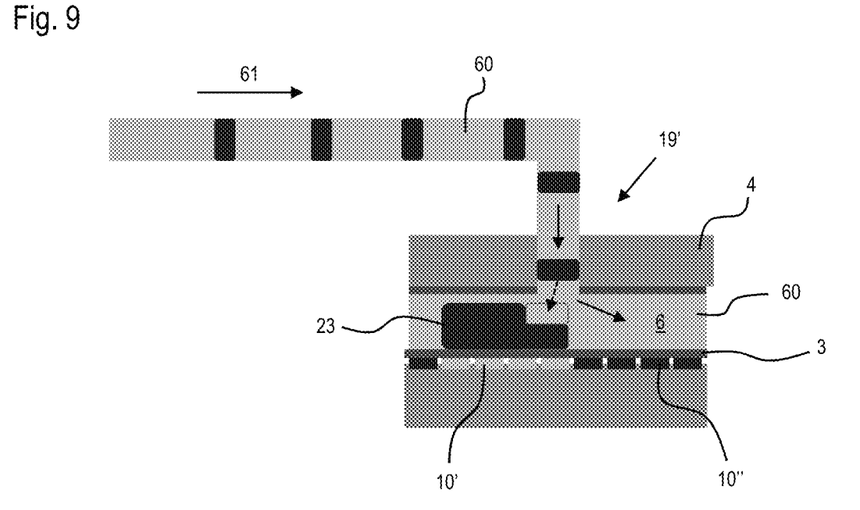
FIG. 9 a schematic view of the inlet port region of FIG. 5, wherein the processing liquid being accumulated to a microfluidic droplet within the cartridge.

FIG. 9 shows a schematic view of the inlet port region of FIG. 5, wherein the processing liquid 61 being accumulated to a liquid droplet 23 within the cartridge 2.

Small quantities of processing liquid 61, enclosed by carrier liquid 60, are introduced in the cartridge 2 through the inlet port 19'. The introduced processing liquid 61 accumulates in the capture zone, i.e. in the zone of influence of the activated electrodes 10'. The carrier liquid 60 bypasses the capture zone. When the accumulated processing liquid 61 has reached the required size of the liquid droplet 23, the droplet 23 is moved away from the inlet port 19' by altering the state of some of the electrodes 10, i.e. by activating some of the neighboring electrodes 10 and by deactivating some of the electrodes 10 closest to the inlet port 19'.

Figure 10:
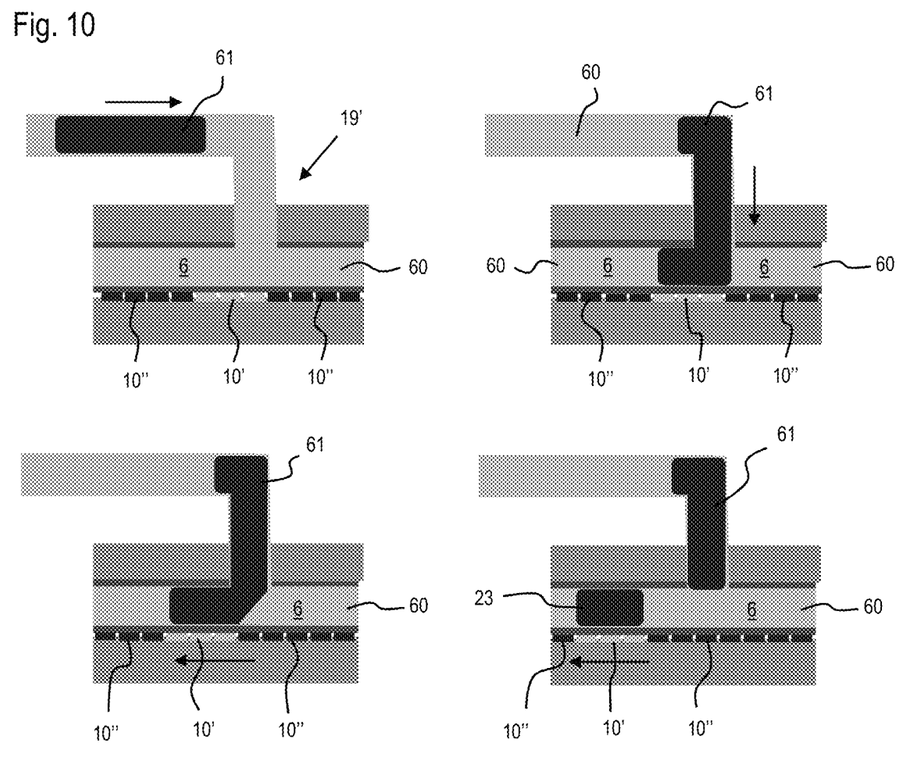
FIG. 10 a schematic depiction of several steps of the introduction of a microfluidic droplet into the gap of the cartridge, wherein the microfluidic droplet being separated from a larger quantity of processing liquid.

FIG. 10 shows a schematic depiction of several steps of the introduction of a microfluidic droplet 23 into the gap 6 of the cartridge 2, wherein the droplet 23 is separated from a larger quantity of processing liquid 61. A quantity of processing liquid 61 that is bigger than the required amount for a liquid droplet 23 is introduced in the gap 6 of the cartridge 2 through the inlet port 19'. Again, the processing liquid 61 accumulates in the capture zone, due to the activated electrodes 10'. When the desired amount of processing liquid 61 for a liquid droplet 23 is accumulated, the liquid droplet 23 is sheared off the larger quantity of processing liquid 61 by activating by activating some of the neighboring electrodes 10 and by deactivating some of the electrodes 10 closest to the inlet port 19'.

Figure 11:
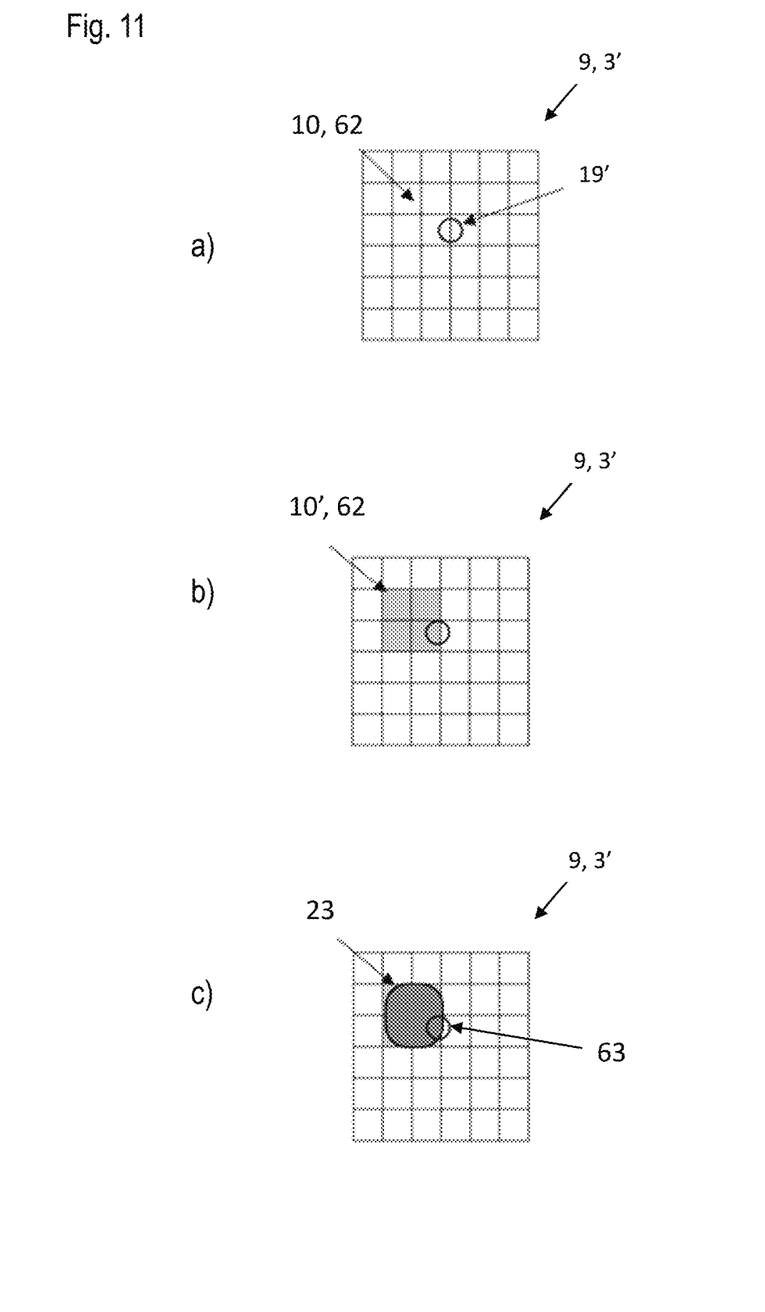
FIG. 11 a schematic depiction of several steps of the introduction of a microfluidic droplet into the gap of the cartridge, wherein the microfluidic droplet being captured by multiple electrodes arranged below the cartridge.

FIG. 11 shows a schematic depiction of several steps of introducing a microfluidic droplet into the gap of the cartridge according to the FIG. 4. Further, FIG. 4 illustrates the method according to the invention.

In this example, the figure shows a top view of the membrane 3' (transparent) with the electrode array 9 arranged underneath the membrane 3'. The electrode array 9, i.e. the set of individual electrodes 10, is positioned such that the electrode closest to the inlet port 19' (i.e. a capture electrode) covers less than 50% of the opening of the inlet port 19' (indicated as circle divided in half).

In a first step to the method, the electrodes 10 are activated to become activated electrodes 10' in anticipation of the arrival of a droplet via the inlet port 19'. The activates electrodes 10' define the capture zone 62, wherein the number of activated electrodes 10' depends on the volume to be captured.

In a further step, the droplet 23 is captured by the activated electrodes 10', depicted in FIG. 11 as liquid droplet 23 after delivery, wherein the liquid droplet 23 substantially covers the four activated electrodes 10' (i.e. four capture electrodes). Despite the capturing of the liquid droplet 23, there is still sufficient room for the carrier fluid to pass by the liquid droplet 23 via remaining open part of the inlet port 19', i.e. via the transfer zone 63.

The term "covering" describes a geometrical overlapping configuration in a projection longitudinally to an axis of the inlet port and/or along an axis of flow exiting the opening area of the inlet port. This corresponds to a visual appearance viewed along an optical axis, which is perpendicular to the electrode array in a direction towards the electrode array.

In an actual configuration, further elements may or may not be present between the opening of the inlet port 19' and the one or more electrodes 10',10" such as a hydrophobic foil, a processing liquid, an empty space in the gap or an electrowetting filler liquid.

Figure 12:
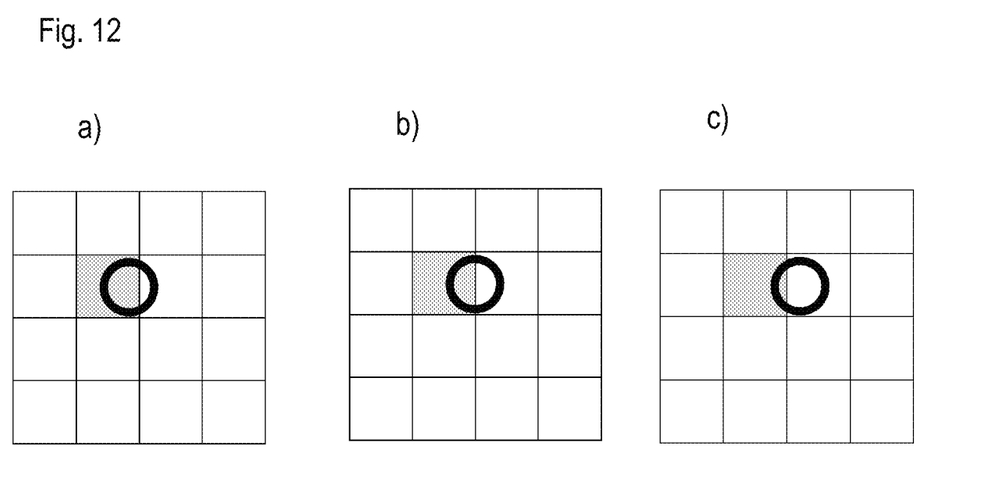
FIG. 12 a schematic depiction of several inlet port and capture electrode configurations.

FIG. 12 shows—in reference to FIG. 11—a schematic depiction of several inlet port and capture electrode configurations:

a) 5-50% coverage;

b) 50% coverage; and c) 55-95% coverage.

In a preferred configuration, the coverage is approximately 50%, other configurations are also possible, e.g. between 5% and 95% of the opening area of the inlet port, between 10% and 90% or between 25% and 75%. These configurations provide sufficient room for a transfer zone that is configured to provide a passage for a carrier liquid next to the microfluidic droplet while processing liquid is captured in the capture zone.

Figure 13:
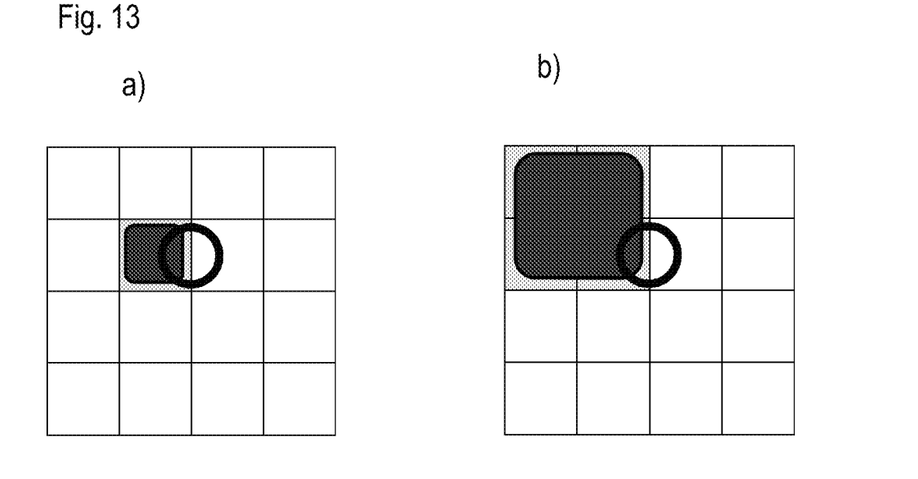
FIG. 13 a schematic depiction a microfluidic droplet being captured by multiple electrodes.

FIG. 13 shows—in reference to FIG. 11—a schematic depiction a microfluidic droplet being captured by multiple electrodes:

a) one electrode activated for accumulating and capturing process liquid, and b) four electrodes activated for accumulating and capturing bigger amounts of process liquid.

During the capturing of an initial droplet neighboring electrodes are activated for enlarging the droplet and moving the already captured liquid over a plurality of electrodes. The neighboring electrodes can be further capturing electrodes or transport electrodes.

Preferred dimensions and materials are pointed to in table 1. These indications of materials and dimensions serve as preferred examples without limiting the scope of the present invention.

TABLE 1

| Part | No | Material | Dimensions and Shape |
|---|---|---|---|
| Droplet | 23 | aqueous | Volume: 0.1-5 µl |
| Substrate | 11 | PCB; Synth. Polymer | — |
| Electrodes | 10 | Al; Cu; Au; Pt | Plating: 1.5 × 1.5 mm |
| Electrode Array | 9 9' | Electrodes | 1 or 2 dimensional |
| Film | 3 | Fluorinated ethylene propylene (FEP), Cyclo olefin polymer (COP), Polypropylene (PP) | thickness: 8-50 µm |
| Hydrophobic surface | 17 | Teflon ® (PTFE), COP, FEP, PP, Cytop | thickness: 8-50 µm Coating: 2-200 nm Spin coating: 5-500 nm, preferably 20 nm |
| Rigid cover | 4 | Mylar ®; acrylic; Polypropylene (PP) | 65 × 85 mm; Plate: 0.5-25.0 mm, preferably 1.5 mm |
| Gap | 6 | — | 0.2-2.0 mm, preferably 0.5 mm |
| Pipetting orifice | 19 | — | Diameter: 0.3-3.0 mm |
| Spacer, Gasket | 5 | Polypropylene (PP), Synthetic or natural rubber | Frame: 0.2-2.0 mm, preferably 0.5 mm |
| Carrier liquid | 60 | Silicon oil | Volume: 1 µl-10 ml |

| REFERENCE SIGNS LIST | |
| --- | --- |
| 1 | electrowetting sample processing system |
| 2 | disposable cartridge |
| 3 | bottom layer |
| 3' | membrane |
| 3" | hydrophobic layer |
| 4 | top layer |
| 5 | spacer |
| 6 | gap between 3 and 4 |
| 7 | base unit |
| 8 | cartridge accommodation site |
| 9, 9' | electrode array |
| 10 | electrode |
| 10' | activated electrode |
| 10" | non-activated electrode |
| 11 | bottom substrate |
| 11' | support element |
| 12 | cover plate |
| 13 | top substrate |
| 14 | central control unit |
| 15 | electrically conductive material |
| 16 | hinge |
| 17 | hydrophobic surface |
| 18 | piercing facility |
| 19 | through hole |
| 19' | inlet port |
| 19" | channel |
| 20 | piercing pipette tip |
| 21 | compartment |
| 22 | additional piercing facility |
| 23 | liquid droplet |
| 24 | dielectric layer |
| 26 | disposable pipette tip |
| 27 | piercing pin |
| 40 | board accommodation site |
| 41 | electrode board |
| 42 | electrical board contact elements |
| 44 | PCB border |
| 50 | supply channel |
| 60 | carrier liquid |
| 61 | processing liquid |
| 62 | capture zone |
| 62' | capture electrode |
| 63 | transfer zone |
| 70 | droplet detector |
| 71 | droplet detector |

The invention claimed is:

1. A method for operating a cartridge in an electrowetting sample processing system, the cartridge comprising an inlet port and an internal gap, the internal gap comprising at least one hydrophobic surface, a capture zone and a transfer zone, the internal gap being configured to provide an electrowetting induced droplet movement, the method comprising:
introducing an input liquid into the internal gap of the cartridge via the inlet port, the input liquid comprising a carrier liquid and a processing liquid and the introduction of the input liquid is accomplished by alternatingly feeding the processing liquid and the carrier liquid into the inlet port before entering the internal gap; and
capturing in the capture zone at least a part of the processing liquid as a microfluidic droplet by use of electrowetting force and providing a passage for the carrier liquid next to the microfluidic droplet, while the processing liquid is captured in the capture zone.

2. A method for operating a cartridge that comprises an inlet port and an internal gap with a capture zone and a transfer zone, the method comprising:
providing an input liquid that comprises a processing liquid and a carrier liquid and the providing of the input liquid is accomplished by alternatingly feeding the processing liquid and the carrier liquid into the inlet port before entering the internal gap;
capturing a part of the processing liquid in the capture zone by use of electrowetting force;
transferring the carrier liquid from the inlet port to the internal gap via the transfer zone, while the part of the processing liquid is captured in the capture zone; and
using the part of the processing liquid in the capture zone for providing a microfluidic droplet that is movable by applying an electrowetting force to the microfluidic droplet.

3. The method according to claim 1, wherein the processing liquid comprises multiple liquid parts, and the capturing is accomplished by accumulating these parts for providing the microfluidic droplet.

4. The method according to claim 3, wherein at least one part of the processing liquid comprising at least one part of the multiple liquid parts, and the at least one part comprises a volume that is insufficient for a transportation by electrowetting and/or a volume of less than 2 µl.

5. The method according to claim 1, comprising sequentially actuating electrodes for inducing a motion of the microfluidic droplet away from the capture zone, thereby enabling a following part of the processing liquid to be captured.

6. A method for operating a sample processing system comprising a cartridge with an inlet port and an internal gap, the internal gap comprising at least one hydrophobic surface, a capture zone and a transfer zone, the internal gap being configured to provide an electrowetting induced droplet movement, the method comprising:
introducing an input liquid into the internal gap of the cartridge via the inlet port, the input liquid comprising a carrier liquid and a processing liquid and the introducing of the input liquid is accomplished by alternatingly feeding the processing liquid and the carrier liquid into the inlet port before entering the internal gap; and
capturing in the capture zone at least a part of the processing liquid as a microfluidic droplet by use of electrowetting force and providing a passage for the carrier liquid next to the microfluidic droplet, while the processing liquid is captured in the capture zone.

7. The method according to claim 1, wherein the carrier liquid that is an electrowetting filler liquid and/or a silicone oil.

8. The method according to claim 1, wherein the processing liquid comprises at least one of:
a reagent liquid,
a buffer,
a diluent,
an extraction liquid,
a washing liquid, and
a suspension.

9. The method according to claim 1, the cartridge comprising at least an electrode array for applying an electrowetting force to the processing liquid and/or the microfluidic droplet.

10. The method according to claim 1, the cartridge comprising a first part with the inlet port and a second part attached to the first part, such that the internal gap is formed between the first part and the second part.

11. The method according to claim 1, wherein the method uses a liquid feeder that is operatively connected to the inlet port by a tube and feeding the input liquid of a predetermined volume to the inlet port.

12. The method according to claim 11, wherein the method uses a controller for operating the liquid feeder, independently and/or asynchronously from the operation of electrodes used for electrowetting.

13. The method according to claim 1, wherein the method uses a detector for monitoring the feed of the input liquid.

14. The method according to claim 1, wherein the transfer zone is provided by an open space, which is located between the inlet port and the top of the microfluidic droplet captured in the capture zone.

15. The method according to claim 1, wherein the method provides the capture zone or at least one capture electrode, either one being located closest to the inlet port such that the area of the capture zone covers between 5% and 95% of the opening area of the inlet port.

16. The method according to claim 1, wherein the method provides at least one capture electrode and the area of the capture electrode covers between 10% and 90% of the opening area of the inlet port or between 25% and 75% of the opening area of the inlet port.

17. The method according to claim 1, wherein the method comprises capturing or accumulating the microfluidic droplet of less than 10 µl in volume.

18. The method according to claim 1, wherein the inlet port comprises a sealing surface for a tube to be inserted into the inlet port.

19. The method according to claim 1, wherein the cartridge comprises at least one electrode comprising at least one capture electrode that is configured to capture the part of the processing liquid as the microfluidic droplet by use of electrowetting force, wherein the edge of the at least one capture electrode is arranged with an offset from the axis of flow of the inlet port.

20. The method according to claim 1, wherein the cartridge comprises at least one electrode, wherein the at least one electrode comprises a transport electrode for removing the microfluidic droplet from the capture zone.

21. The method according to claim 1, wherein the cartridge is a disposable cartridge.

22. The method according to claim 1, wherein the sample processing system is a biological sample processing system.

23. The method according to claim 1, wherein the processing liquid comprises multiple liquid parts of different compositions and the capturing is accomplished by accumulating these parts for providing the microfluidic droplet.

24. The method according to claim 1, wherein the processing liquid comprises a suspension of at least one of magnetic beads, single cells and cell aggregates.

25. The method according to claim 12, wherein the method uses a droplet generator for operating the liquid feeder.

26. The method according to claim 1, wherein the method uses a detector for monitoring the feed of the processing liquid and/or the carrier liquid.

* * * * *